United States Patent
Sullenberger et al.

(10) Patent No.: US 9,729,348 B2
(45) Date of Patent: Aug. 8, 2017

(54) TUNNEL-IN-TUNNEL SOURCE ADDRESS CORRECTION

(71) Applicant: Cisco Technology, Inc., San Jose, CA (US)

(72) Inventors: Michael L. Sullenberger, San Jose, CA (US); Manish Kumar, Jharkhand (IN); Eitan Ben-Nun, Sunnyvale, CA (US); Anand Oswal, Pleasanton, CA (US)

(73) Assignee: Cisco Technology, Inc., San Jose, CA (US)

( * ) Notice: Subject to any disclaimer, the term of this patent is extended or adjusted under 35 U.S.C. 154(b) by 81 days.

(21) Appl. No.: 14/730,654

(22) Filed: Jun. 4, 2015

(65) Prior Publication Data

US 2016/0359738 A1 Dec. 8, 2016

(51) Int. Cl.
*H04L 12/46* (2006.01)
*H04L 29/12* (2006.01)
*H04L 12/741* (2013.01)
*H04L 29/06* (2006.01)

(52) U.S. Cl.
CPC ......... *H04L 12/4633* (2013.01); *H04L 45/74* (2013.01); *H04L 69/22* (2013.01); *H04L 61/2592* (2013.01)

(58) Field of Classification Search
CPC .... H04L 45/74–45/748; H04L 12/4633; H04L 12/4641–12/4695; H04L 61/256–61/2592
See application file for complete search history.

(56) References Cited

U.S. PATENT DOCUMENTS

| | | | |
|---|---|---|---|
| 6,704,282 B1 | 3/2004 | Sun et al. | |
| 8,270,310 B2 | 9/2012 | Raleigh | |
| 2005/0088977 A1 | 4/2005 | Roch et al. | |
| 2007/0283430 A1 | 12/2007 | Lai et al. | |
| 2013/0259060 A1* | 10/2013 | Liu | H04L 12/4633 370/401 |
| 2013/0315248 A1* | 11/2013 | Morimoto | H04L 12/4633 370/392 |
| 2014/0086253 A1* | 3/2014 | Yong | H04L 12/4633 370/395.53 |
| 2015/0124821 A1* | 5/2015 | Chu | H04L 45/22 370/392 |
| 2015/0146736 A1* | 5/2015 | Kawai | H04L 12/4633 370/400 |
| 2015/0195197 A1* | 7/2015 | Yong | H04L 45/74 370/392 |
| 2015/0236952 A1* | 8/2015 | Liang | H04L 61/2596 370/230 |
| 2016/0065386 A1* | 3/2016 | Hari | H04L 12/4679 370/254 |
| 2016/0226815 A1* | 8/2016 | Wan | H04L 61/2007 |
| 2016/0277355 A1* | 9/2016 | Shetty | H04L 61/2592 |

* cited by examiner

*Primary Examiner* — Marcus R Smith
(74) *Attorney, Agent, or Firm* — Parker Ibrahim & Berg LLC; James M. Behmke; Stephen D. LeBarron

(57) ABSTRACT

In one embodiment, a device in a network identifies a translated source network address for a tunnel source of a tunnel-in-tunnel packet. The device includes the translated source network address within a header of the packet. The header of the packet identifies an inner tunnel that is encapsulated within an outer tunnel during transmission of the packet within the network. The device sends the packet with the translated source network address within the header of the packet.

17 Claims, 13 Drawing Sheets

TUNNEL-IN-TUNNEL SOURCE ADDRESS CORRECTION

TECHNICAL FIELD

The present disclosure relates generally to computer networks, and, more particularly, to correcting source addresses within certain tunnel-in-tunnel traffic.

BACKGROUND

Enterprise networks are carrying a very fast growing volume of both business and non-business critical traffic. Often, business applications such as video collaboration, cloud applications, etc., use the same hypertext transfer protocol (HTTP) and/or HTTP secure (HTTPS) techniques that are used by non-business critical web traffic. This complicates the task of optimizing network performance for specific applications, as many applications use the same protocols, thus making it difficult to distinguish and select traffic flows for optimization.

Some enterprise networks are now also leveraging the use of virtual service platforms (VSP). In general, VSPs are virtual entities within a computer network that provide particular services for the enterprise. For example, traffic within the network may be routed through a particular VSP for purposes of performing security functions, caching, analytics, etc. Typically, such traffic is sent via a virtual private network (VPN) tunnel with the VSP.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

According to one or more embodiments of the disclosure, a device in a network identifies a translated source network address for a tunnel source of a tunnel-in-tunnel packet. The device includes the translated source network address within a header of the packet. The header of the packet identifies an inner tunnel that is encapsulated within an outer tunnel during transmission of the packet within the network. The device sends the packet with the translated source network address within the header of the packet.

Description

A computer network is a geographically distributed collection of nodes interconnected by communication links and segments for transporting data between end nodes, such as personal computers and workstations, or other devices, such as sensors, etc. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), and others. The Internet is an example of a WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol consists of a set of rules defining how the nodes interact with each other. Computer networks may be further interconnected by an intermediate network node, such as a router, to extend the effective "size" of each network.

Figure 1:
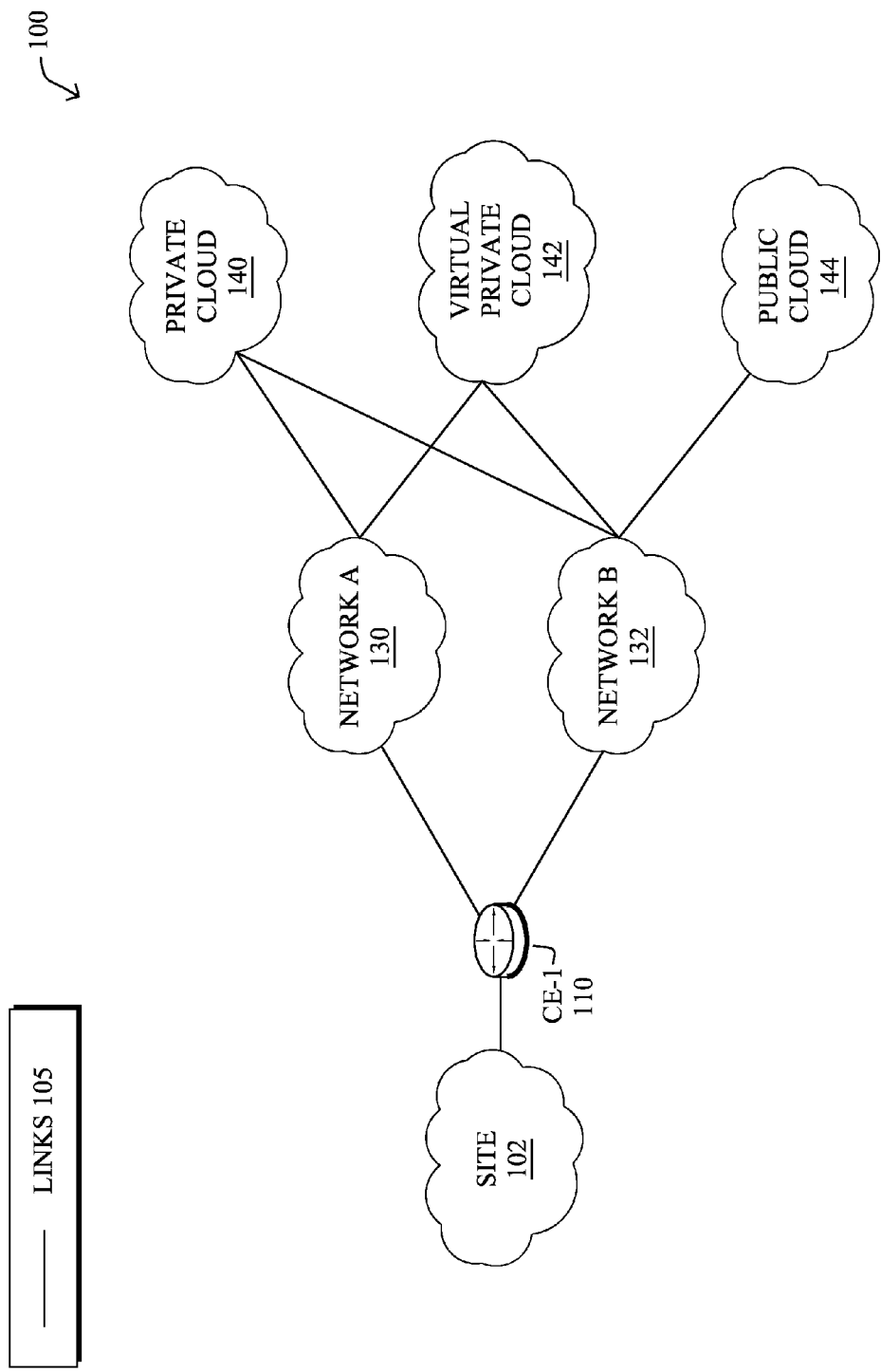
FIG. 1 illustrates an example communication system.

FIG. 1 is a schematic block diagram of an example communication system 100, according to various embodiments. As shown, a site 102 (e.g., a branch of an enterprise network, etc.) may connect the various computing devices located at site 102 (e.g., a LAN of devices) to various remote devices/services via one or more customer edge (CE) routers 110 and links 105. Such remote devices/services may exist within a private cloud 140, a virtual private cloud 142, a public cloud 144, or the like. In general, one or more CE routers 110 (e.g., router CE-1, etc.), may provide connectivity between devices on one or more LANs of site 102 with the devices/services associated with clouds 140-144. For example, public cloud 144 may include a publicly available web server, whereas private cloud 140 may include a server located within a data center operated by the same entity associated with site 102.

Data packets (e.g., traffic/messages) may be exchanged among the nodes/devices of the communication system 100 over links 105 using predefined network communication protocols such as TCP/IP, User Datagram Protocol (UDP), Asynchronous Transfer Mode (ATM) protocol, Frame Relay protocol, or any other suitable protocol. Those skilled in the art will understand that any number of nodes, devices, links, etc. may be used in the system, and that the view shown herein is for simplicity.

A particular site may be connected to clouds 140, 142, and/or 144 via any number of different core networks. For example, as shown, site 102 may be connected to a first network 130 and also to a second network 132, the links to which may exhibit very different network service level agreement (SLA) characteristics. Connections between site 102 and networks 130-132 may comprise, in various embodiments, public Internet connections, multiprotocol label switching (MPLS) networks, or the like. In one embodiment, networks 130, 132 may even be associated with different service providers.

For the sake of illustration, a given site may fall under any of the following categories:

1.) Site Type A: a site connected using a private or virtual private network (VPN) link via a single CE router and a single link, with potentially a backup link (e.g., a 3G/4G/LTE backup connection). For example, CE-1 shown may support site 102 via a link to network 130 (e.g., an MPLS network), potentially also with a backup network connection via a cellular wireless connection.

2.) Site Type B: a site connected using two VPN links (e.g., from different service providers), with potentially a backup link (e.g., a 3G/4G/LTE connection). In one example, dynamic tunneling techniques, such as Dynamic Multipoint Virtual Private Network (DMVPN) by Cisco Systems™ or the like, may be used to dynamically build VPN tunnels over one or more MPLS networks, one or more Internet connections, etc. A site of type B may itself be of different types:

2a.) Site Type B1: a site connected using two MPLS VPN links (e.g., from different service providers), with potentially a backup link (e.g., a 3G/4G/LTE connection). For example, networks 130 and 132 may be different MPLS networks, in one embodiment.

2b.) Site Type B2: a site connected to the network using one MPLS VPN link and one link connected to the public Internet, with potentially a backup link (e.g., a 3G/4G/LTE connection). For example, network 130 may be an MPLS network, whereas the connection to network 132 may be a public Internet connection, potentially also with a cellular wireless backup link.

2c.) Site Type B3: a site connected to the network using two links connected to the public Internet (e.g., via different service providers), with potentially one or more backup links (e.g., a 3G/4G/LTE connection). For example, the connections between CE-1 and both of networks 130, 132 may be public Internet connections via different service providers.

As would be appreciated, MPLS VPN links are usually tied to a committed SLA, whereas Internet links may either have no SLA at all or a loose SLA (e.g., a "Gold Package" Internet service connection that guarantees a certain level of performance to a customer site).

3.) Site Type C: a site of type B (e.g., types B1, B2 or B3) but with more than one CE router (e.g., a first CE router connected to one network while a second CE router is connected to the other network), with potentially one or more backup links (e.g., a wireless 3G/4G/LTE backup link). For example, site 102 may include a first CE router 110 connected to network 130 and a second CE router 110 connected to network 132, in another embodiment.

As would be appreciated, any number of devices, configurations, and network connections may be used to provide remote communications to and from a given site. Further, while certain topologies are depicted, such as with a site connected to different service provider networks, other topologies may be used in other embodiments (e.g., site 102 may be connected to three different service provider networks, four different networks, etc.).

Numerous types of application traffic may be flowing through current day networks. For example, a particular CE router 110 located at a customer site may provide and receive different forms of application traffic that is communicated through communication system 100. For example, traffic associated with a given customer site may include, but is not limited to, video data (e.g., video conferencing data), audio data (e.g., voice-over-IP (VoIP)), enterprise resource planning (ERP) data, customer relationship management (CRM) data, and the like. Each form of traffic may have specific network requirements and may be very demanding with respect to network availability and resiliency, such that even small deviations in network conditions may render an application incapable of providing the requisite experience to the end user. For example, low network performance may result in a video conference appearing choppy to the end users.

Figure 2:
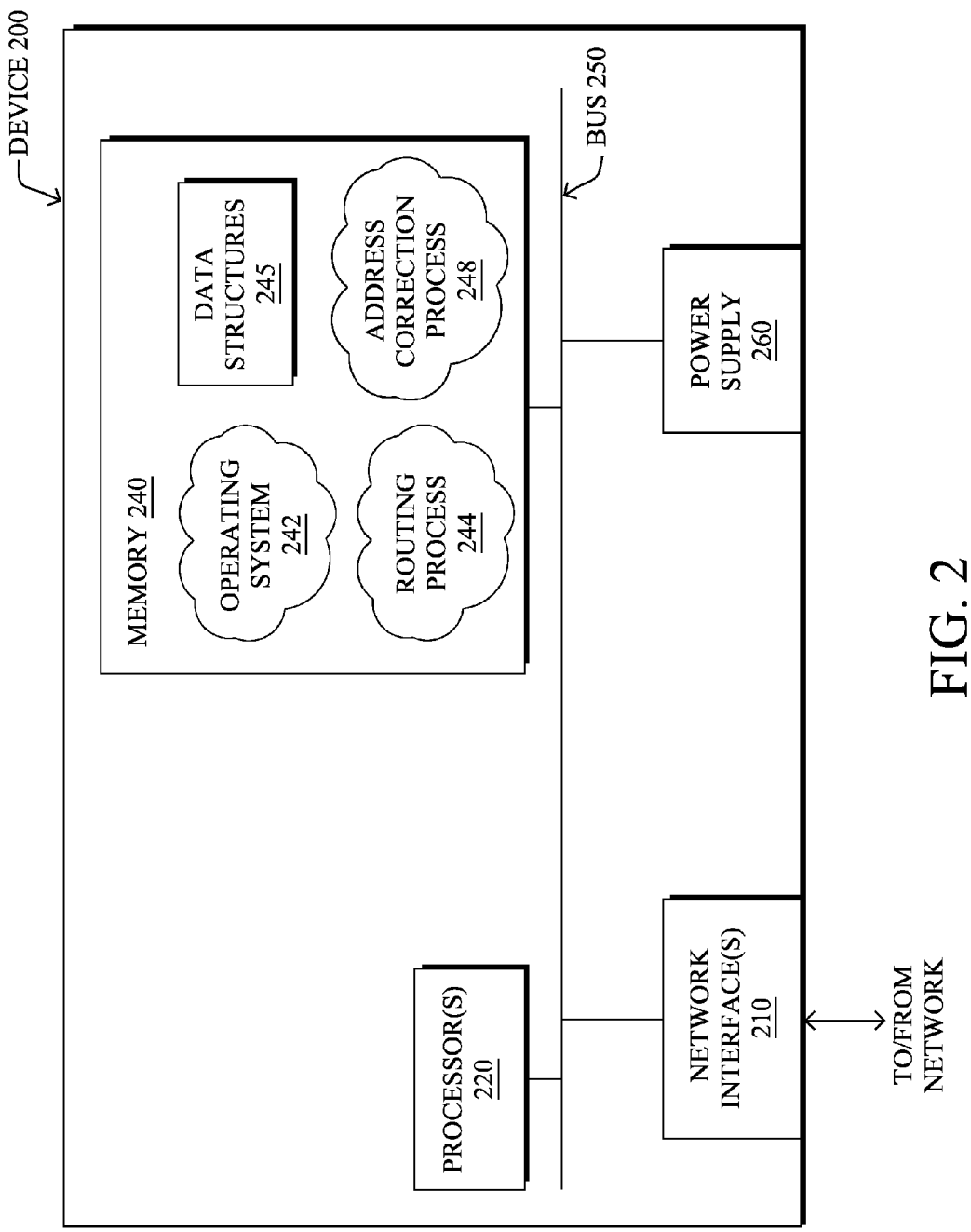
FIG. 2 illustrates an example network device/node.

FIG. 2 is a schematic block diagram of an example node/device 200 that may be used with one or more embodiments described herein, e.g., as any of the devices associated with system 100 (e.g., a router, switch, etc.), any other computing device that supports the operations of system 100 (e.g., servers, network controllers, etc.), or any of the other devices referenced below. The device 200 may also be any other suitable type of device depending upon the type of network architecture in place. Device 200 generally comprises one or more network interfaces 210, one or more processors 220, and a memory 240 interconnected by a system bus 250, and is powered by a power supply 260.

The network interfaces 210 include the mechanical, electrical, and signaling circuitry for communicating data over physical links coupled to the communication system 100. The network interfaces may be configured to transmit and/or receive data using a variety of different communication protocols. Notably, a physical network interface 210 may also be used to implement one or more virtual network interfaces, such as for virtual private network (VPN) access, known to those skilled in the art.

The memory 240 comprises a plurality of storage locations that are addressable by the processor(s) 220 and the network interfaces 210 for storing software programs and data structures associated with the embodiments described herein. The processor 220 may comprise necessary elements or logic adapted to execute the software programs and manipulate the data structures 245. An operating system 242 (e.g., the Internetworking Operating System, or IOS®, of Cisco Systems, Inc., another operating system, etc.), portions of which are typically resident in memory 240 and executed by the processor(s), functionally organizes the device by, inter alia, invoking network operations in support of software processors and/or services executing on the device. These software processors and/or services may comprise routing process 244 (e.g., routing services) and illustratively, an address correction process 248, as described herein.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while processes may be shown and/or described separately, those skilled in the art will appreciate that processes may be routines or modules within other processes.

Routing process/services 244 include computer executable instructions executed by processor 220 to perform functions provided by one or more routing protocols, such as the Interior Gateway Protocol (IGP) (e.g., Open Shortest Path First, "OSPF," and Intermediate-System-to-Intermediate-System, "IS-IS"), the Border Gateway Protocol (BGP), etc., as will be understood by those skilled in the art. These functions may be configured to manage a forwarding information database including, e.g., data used to make forwarding decisions. In particular, changes in the network topology may be communicated among routers 200 using routing protocols, such as the conventional OSPF and IS-IS link-state protocols (e.g., to "converge" to an identical view of the network topology).

Notably, routing process 244 may also perform functions related to virtual routing protocols, such as maintaining a VRF instance, or tunneling protocols, such as for MPLS, generalized MPLS (GMPLS), etc., each as will be understood by those skilled in the art. In one embodiment, routing process 244 may be operable to establish dynamic VPN tunnels, such as by using a DMVPN overlay onto the network.

Routing process/services 244 may further be configured to perform additional functions such as security functions, firewall functions, application and visibility control (AVC) or similar functions, reporting and/or monitoring functions, performance routing (PfR) or similar functions, combinations thereof, or the like. As would be appreciated, routing process/services 244 may be configured to perform any of its respective functions independently or in conjunction with one or more other devices. In other words, in some cases, device 200 may provide supervisory control over the operations of one or more other devices. In other cases, device 200 may be controlled in part by another device that provides supervisory control over the operations of device 200.

Figure 3A:
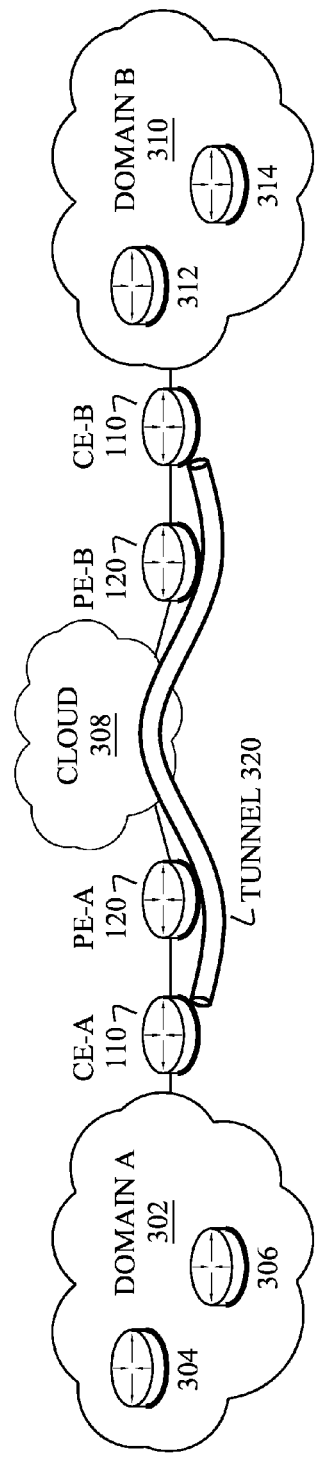
FIGS. 3A-3B illustrate an example of traffic being sent within a communication system.

As noted above, VPN tunnels may be created between separate network domains, such as a local domain and a remote domain. As shown in FIG. 3A, assume that a first networking domain 302 (e.g., domain "A") includes any number of computing devices 304-306 that are addressed within domain 302. For example, domain 302 may be located at a network branch/site (e.g., site 102, etc.), data center or cloud environment, or the like. Similarly, remote domain 310 (e.g., domain "B") may include devices 312-314 that are addressed on the local domain B.

CE routers 110 may facilitate inter-domain communications between the devices of domains 302 and 310. For example, domain 302 may have one or more CE routers 110 (e.g., router CE-A) in communication with one or more provider edge (PE) routers 120 (e.g., a router PE-A) of a provider network (e.g., network 130, network 132, etc.). Similarly, domain 310 may have one or more CE routers 110 (e.g., router CE-B) in communication with one or more PE routers 120 (e.g., PE-B). PE routers 120 may be communicatively connected via a cloud/network 308. As would be appreciated, network 308 may be operated by the same service provider as that of PE-A and PE-B or may span networks operated by multiple service providers (e.g., CE-A and CE-B are connected via the Internet through different service providers, etc.).

As shown, tunnel 320 may be established between CE-A and CE-B via which communications between domains 302 and 310 may be sent. For example, tunnel 320 may be a DMVPN multipoint, bi-directional tunnel or any other form of tunnel (e.g., IPSEC, etc.) between domains A and B.

In many cases, a service provider (SP) may perform network address translation (NAT), to transform an internal address (e.g., within domain A) into a global address seen by the WAN/cloud network 308. In these instances, the SP-NAT (e.g., PE-A, a device associated with PE-A, etc.) may receive a packet from domain A via CE-A. In response, the SP-NAT may translate a source address X from domain A into a global address X' before sending the packet towards domain B via cloud network 308. In the reverse, the translated address X' may be used by the device(s) of domain B (e.g., CE-B, etc.), so that when a packet is sent from domain B to domain A, the SP-NAT can translate the global destination address X' back into the internal address X of domain A. Note that this initial tunnel (e.g., tunnel 320) may be set up between domain A and domain B specifically between two border routers (e.g., CE-A and CE-B), such that the two border routers view each other as end-points of this initial tunnel, and CE-B notably sees address X' for CE-A.

Figure 3B:
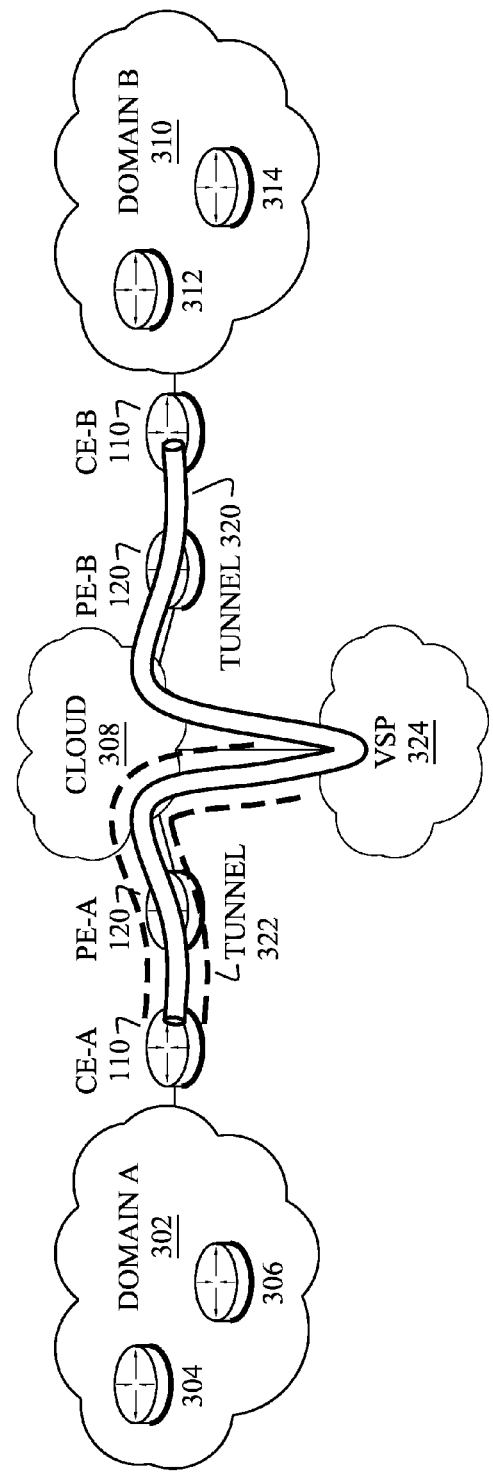

In some cases, a network may employ the use of one or more virtual service platforms (VSPs) to process traffic between domains (e.g., a router associated with the VSP). For example, as shown in FIG. 3B, assume that some or all of the traffic communicated between domains A and B are to be sent via a VSP 324 (e.g., for purposes of performing caching operations, security operations, etc.). In such cases, the initial tunnel 320 may be established first between domains A and B, as described above. Once established, a second, redirecting tunnel 322 (e.g., an IPSEC tunnel, etc.) may be established between CE-A and VSP 324. In other words, the initial tunnel 320 between domains A and B may be encapsulated within a second tunnel 322 that directs the traffic of tunnel 320 through VSP 324.

In response to receiving a tunnel-in-tunnel packet from CE-A, the receiving device associated with VSP 324 may decapsulate the packet from the outer tunnel (e.g., tunnel 322), to reveal the packet still encapsulated for the inner tunnel 320. The device may then process the decapsulated traffic, which is still encapsulated for tunnel 320, and forward the traffic along to the destination of tunnel 320 (e.g., CE-B).

Figure 4A:
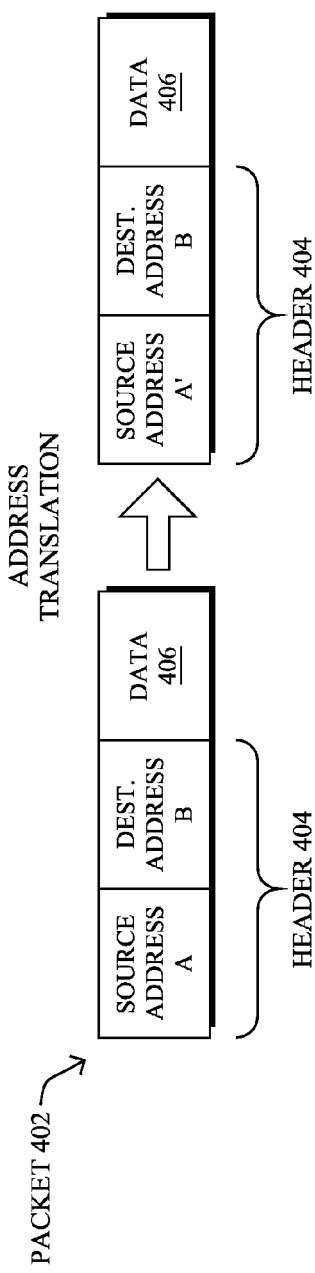
FIGS. 4A-4C illustrate examples of a packet being processed within a communication system.
Figure 4B:
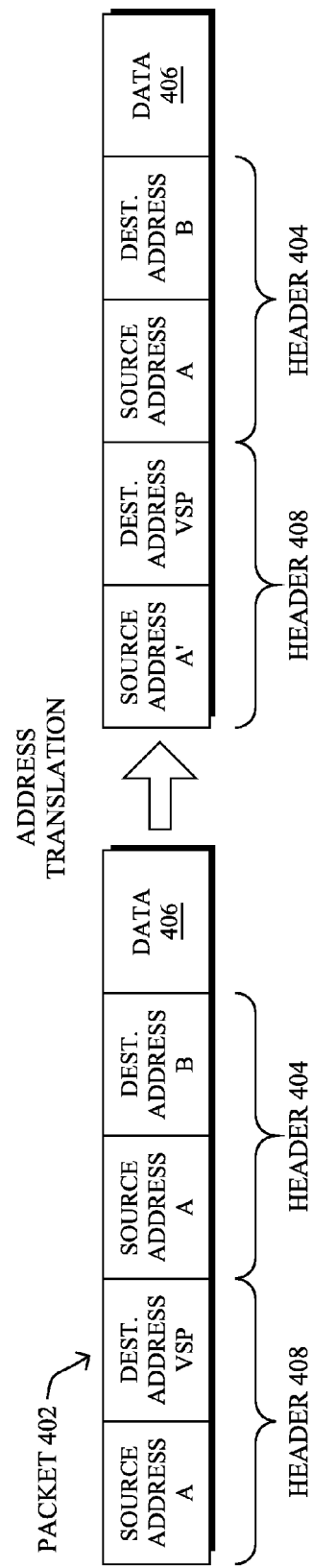
Figure 4C:
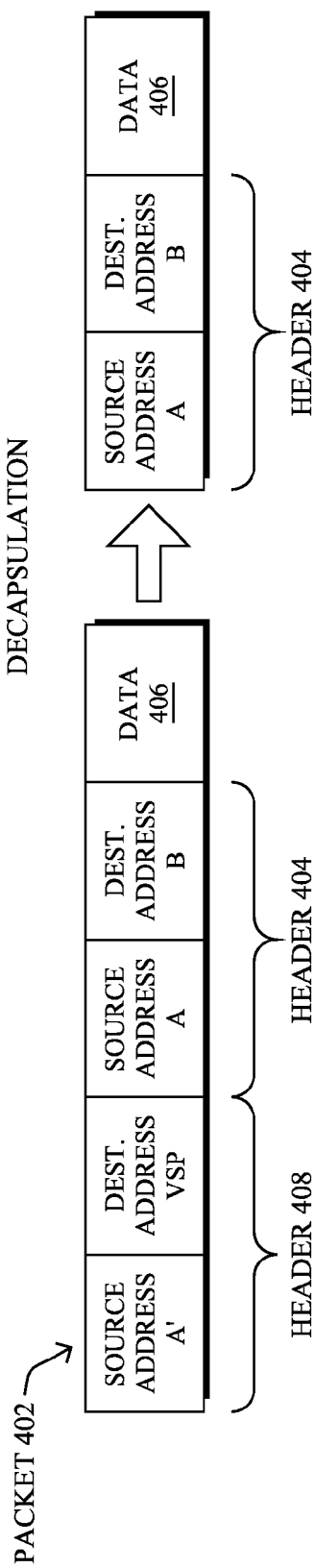

Referring now to FIGS. 4A-4C, examples of the processing of tunnel-in-tunnel packets are shown, according to various embodiments. As shown in FIG. 4A, assume that a packet 402 includes the original data/payload 406 that is encapsulated within a first tunnel. Notably, during the encapsulation, a tunnel header 404 may be added to the original data 406, to identify the tunnel (e.g., tunnel 320). Within header 404 may be the source and destination addresses associated with the tunnel. Thus, in the situation depicted in FIG. 3A, the PE-NAT may simply translate the source address A from domain A within tunnel header 404 into a translated source address A'.

As shown in FIG. 4B, in the case of tunnel-in-tunnel traffic, such as that used in the example of FIG. 3B, packet 402 may include multiple headers to indicate the different tunnels. Notably, packet 402 may be encapsulated for a second/outer tunnel (e.g., tunnel 322) by also including a second tunnel header 408 that identifies the outer tunnel. However, in such a case, the PE-NAT may only translate the source address included within the outer tunnel header 408, while leaving the source address in the inner tunnel header 404 untouched. Consequently, as shown in FIG. 4C, when packet 402 is decapsulated at VSP 324 (e.g., by a networking device), header 408 may be removed from packet 402. In doing so, header 404 may be exposed and packet 402 may be forwarded on towards CE-B. However, since the source address was translated only in header 408, CE-B will receive the non-translated address A that is internal to domain A within header 404. Since CE-B may not understand the non-translated source address, it may drop packet 402 or otherwise confuse a corresponding application, when attempting to determine the actual source of the traffic.

Tunnel-in-Tunnel Source Address Correction

The techniques herein provide for source address correction for tunnel-in-tunnel traffic. In some aspects, a source border router may receive an indication of the translated address from the corresponding destination border router and set the translated address within the inner header for the inner tunnel. In another aspect, the address correction may be performed in conjunction with the decapsulation of the outer tunnel. For example, the receiving VSP or other device may determine whether the source addresses of the inner and outer headers differ and, if so, change the source address within the inner header to match that of the outer header, before forwarding on the traffic.

Specifically, according to one or more embodiments, a device in a network identifies a translated source network address for a tunnel source of a tunnel-in-tunnel packet. The device includes the translated source network address within a header of the packet. The header of the packet identifies an inner tunnel that is encapsulated within an outer tunnel during transmission of the packet within the network. The device sends the packet with the translated source network address within the header of the packet.

Illustratively, the techniques described herein may be performed by hardware, software, and/or firmware, such as in accordance with the address correction process 248, which may include computer executable instructions executed by the processor 220 (or independent processor of interfaces 210) to perform functions relating to the techniques described herein, e.g., in conjunction with routing process 244. For example, the techniques herein may be treated as extensions to conventional protocols and as such, may be processed by similar components understood in the art that execute those protocols, accordingly.

Operationally, the techniques herein allow the source address within a header associated with an inner tunnel of a tunnel-in-tunnel packet to be translated, prior to receipt by the remote endpoint. Notably, the techniques herein may allow traffic to be redirected/tunneled through a VSP, while still facilitating source address correction, prior to the traffic reaching the destination of the initial tunnel.

Figure 5A:
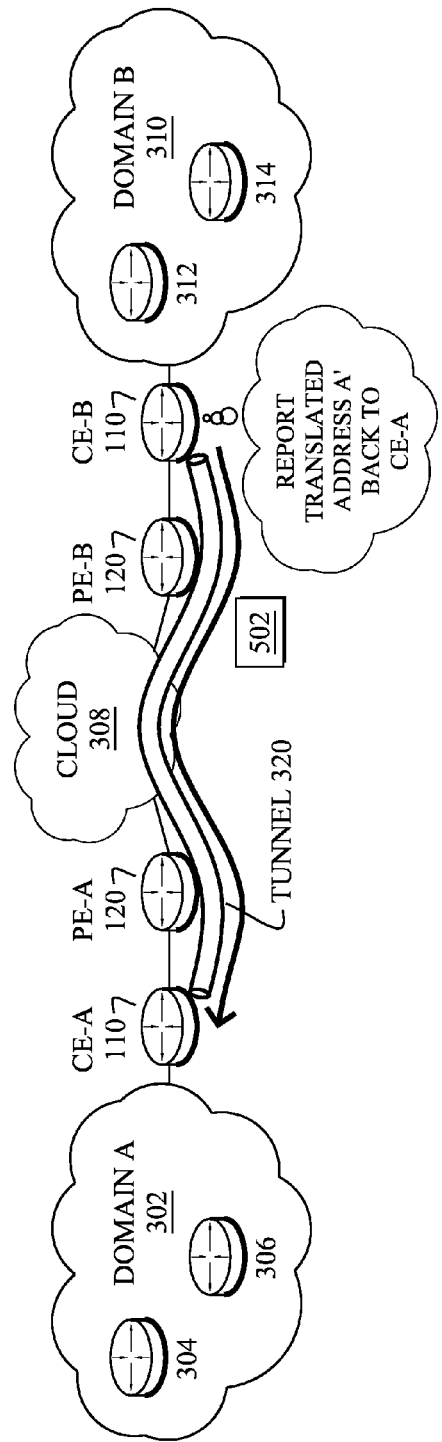
FIGS. 5A-5D illustrate an example of a translated network address being included within a tunnel header, prior to encapsulation for a second tunnel.

Referring now to FIGS. 5A-5D, examples are shown of a translated network address being included within a tunnel header, in accordance with various embodiments. In some embodiments, the encapsulator (e.g., CE-A) may receive an indication of the translated source address from another device. For example, as shown in FIG. 5A, CE-A may receive a message 502 from CE-B that indicates the source address that was translated by the SP-NAT. In particular, when tunnel 320 is first established between CE-A and CE-B, CE-B may learn of the translated source address and provide the translated address back to CE-A via message 502. For example, message 502 may be a Next Hop Resolution Protocol (NHRP) that indicates the translated source address or another message sent via a different protocol.

Figure 5B:
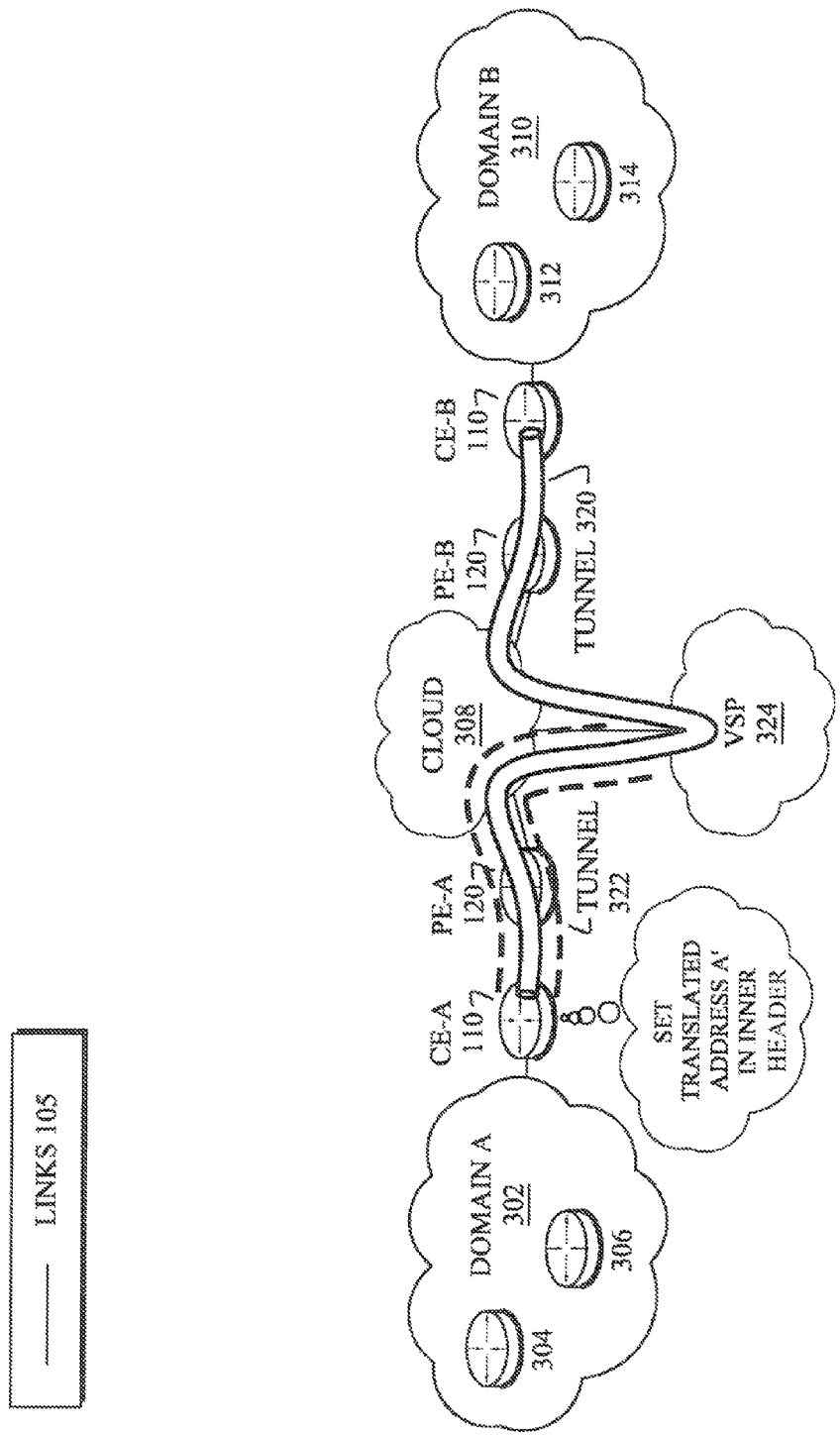
Figure 5C:
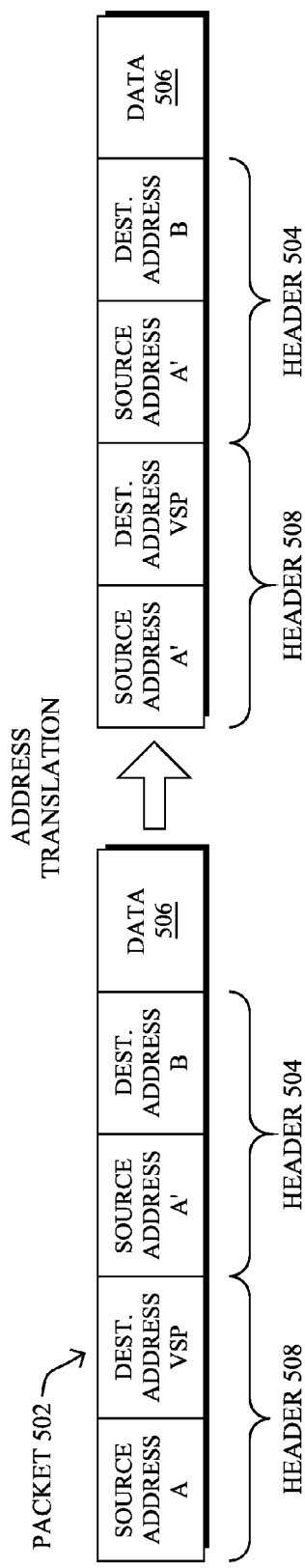

In response to receiving an indication of the translated source address, the encapsulator may set the source address within the inner header to be the translated address, as shown in FIG. 5B. An example of such a packet operation is shown in FIG. 5C. As shown, CE-A may set the source address within header 504 for the inner tunnel (e.g., tunnel 320) to be equal to the translated source address indicated by message 502. In other words, CE-A may first encapsulate data 506 for tunnel 320 using the translated source address within the corresponding header 504. Once set, CE-A may further encapsulate the packet for the outer tunnel (e.g., tunnel 322) using header 508.

Figure 5D:
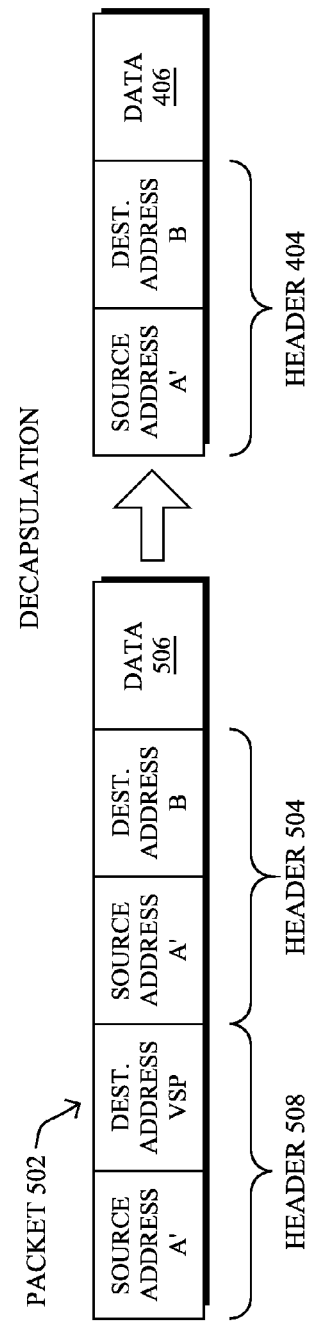

In one embodiment, CE-A may still use the non-translated source address within header 508 and the translated source address within the inner header 504. Thus, as part of the address resolution performed by the PE-NAT, the source address in the outer header 508 may be translated, and both of headers 504 and 508 may now be set to the translated source address. Then, as shown in FIG. 5D, when packet 502 is decapsulated for the outer tunnel (e.g., at VSP 324), the exposed source address in inner header 504 is the source address translated by the PE-NAT, and packet 502 may be forwarded on towards CE-B.

Figure 6A:
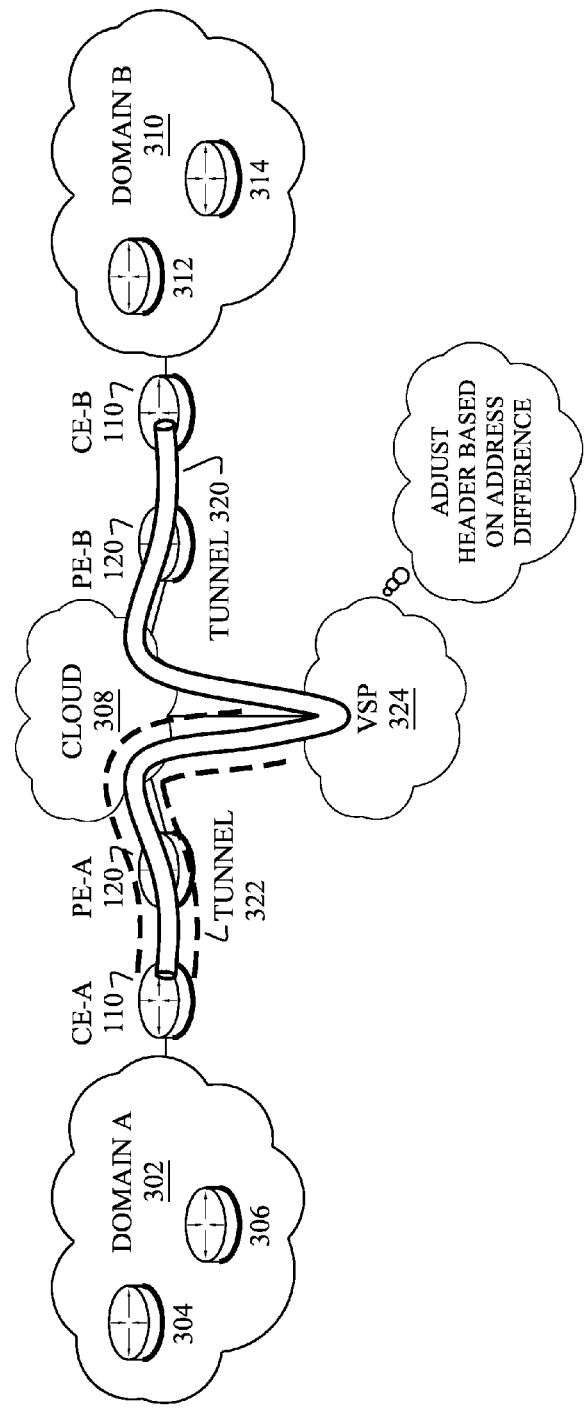
FIGS. 6A-6B illustrate an example of the source address within a header for an inner tunnel being corrected in conjunction with decapsulation of the packet from an outer tunnel.
Figure 6B:
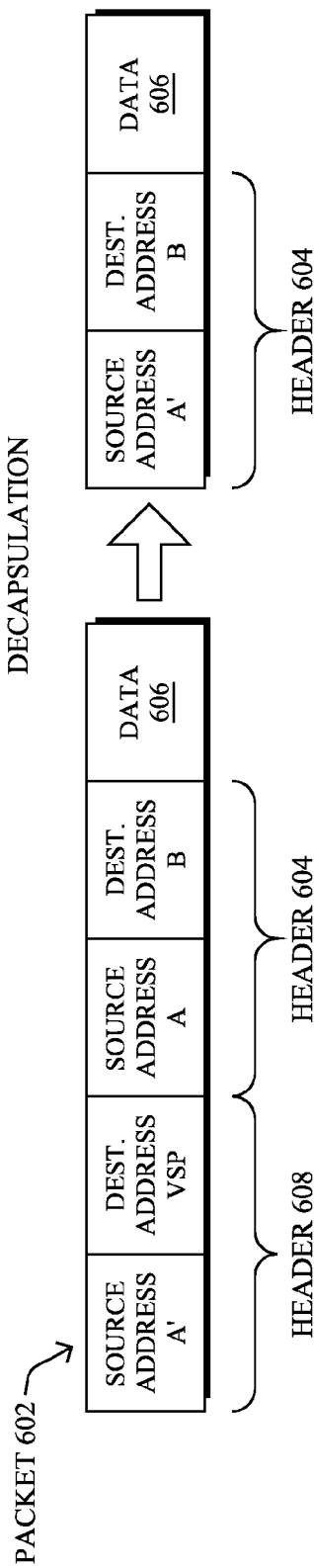

FIGS. 6A-6B illustrate another example of the tunnel source address within a header for an inner tunnel being corrected in conjunction with decapsulation from an outer tunnel, according to various embodiments. In further embodiments, as shown in FIG. 6A, a device associated with the destination of the outer tunnel (e.g., VSP 324) may instead perform the address correction for the inner tunnel header. In particular, the decapsulating device may determine whether a difference exists between the source addresses of the inner and outer headers. If so, the device may set the source address in the header for the inner tunnel to be equal to the translated address that was included in the header for the outer tunnel, before forwarding the traffic on to the destination of the inner tunnel.

An example of the decapsulation process is shown in FIG. 6B, in one embodiment. As shown, assume that the data 606 of packet 602 is encapsulated by CE-A using inner header 604 (e.g., for tunnel 320) and outer header 608 (e.g., for tunnel 322). As in the case of FIG. 4C, CE-A may not perform any address correction on packet 602. Thus, the PE-NAT between CE-A and VSP 324 may only translate the source address in outer header 608 during forwarding, while leaving the source address in inner header 604 unchanged. However, as shown in FIGS. 6A-6B, a comparison may be made during the decapsulation process between the source addresses in headers 604 and 608, to identify the translated source address.

If a difference is determined between the source addresses of headers 604 and 608, the processing device may decapsulate packet 602 (e.g., by removing header 608) and change the source address within header 604 before forwarding on the packet. In particular, the device may determine that the source address in header 608 is A', whereas the source address in header 604 is A. In such a case, the device may identify the source address in header 608 as a translated address and make the corresponding translation within header 604 before forwarding packet 602 on towards the destination of the inner tunnel.

Figure 7:
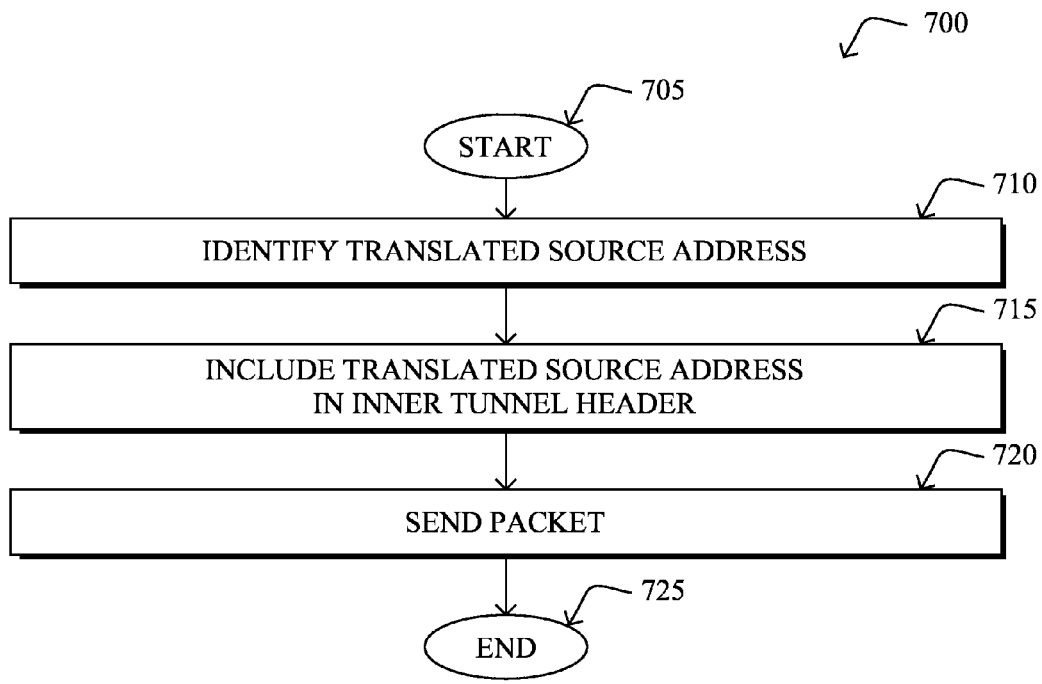
FIG. 7 illustrates an example simplified procedure for performing tunnel-in-tunnel source address correction.

Referring now to FIG. 7, an example simplified procedure for performing tunnel-in-tunnel source address correction is shown, according to various embodiments. In general, procedure 700 may be performed by any networking device (e.g., device 200) such as a router, etc., to correct the source address of a header for an inner tunnel of tunnel-in-tunnel traffic. Procedure 700 may begin at step 705 and continue on to step 710 where, as described in greater detail above, the device may identify a translated source address for the source of the tunnel-in-tunnel traffic. In one embodiment, if the device is also the border router that encapsulates the traffic, the device may identify the translated address by receiving an indication of the translated address from another device. For example, the encapsulating device may receive the translated address from the destination border router (e.g., via an NHRP message, etc.) or from another intermediary device in the network. In another embodiment, if the device decapsulates the traffic from the outer tunnel, the device may identify the translated address by analyzing the source address included in the header for the outer tunnel (e.g., by determining whether the source addresses in the inner and outer headers differ).

At step 715, the device may include the translated source address within the header of the packet that is associated with the inner tunnel, as described in greater detail above.

For example, if the device is the border router that encapsulates the traffic for the tunnels, the device may include the translated source address within the header for the inner tunnel, prior to encapsulating the packet for the outer tunnel. Conversely, if the device decapsulates the packet from the outer tunnel, the device may set the source address in the header for the inner tunnel to be the translated address included in the outer/decapsulated header.

At step 720, as detailed above, the device may send the packet with the translated source address towards the destination of the packet. In doing so, the destination border router of the inner tunnel may receive a packet that includes the translated source address in its header, despite the PE-NAT not translating the source address within that header. Procedure 700 then ends at step 725.

Figure 8:
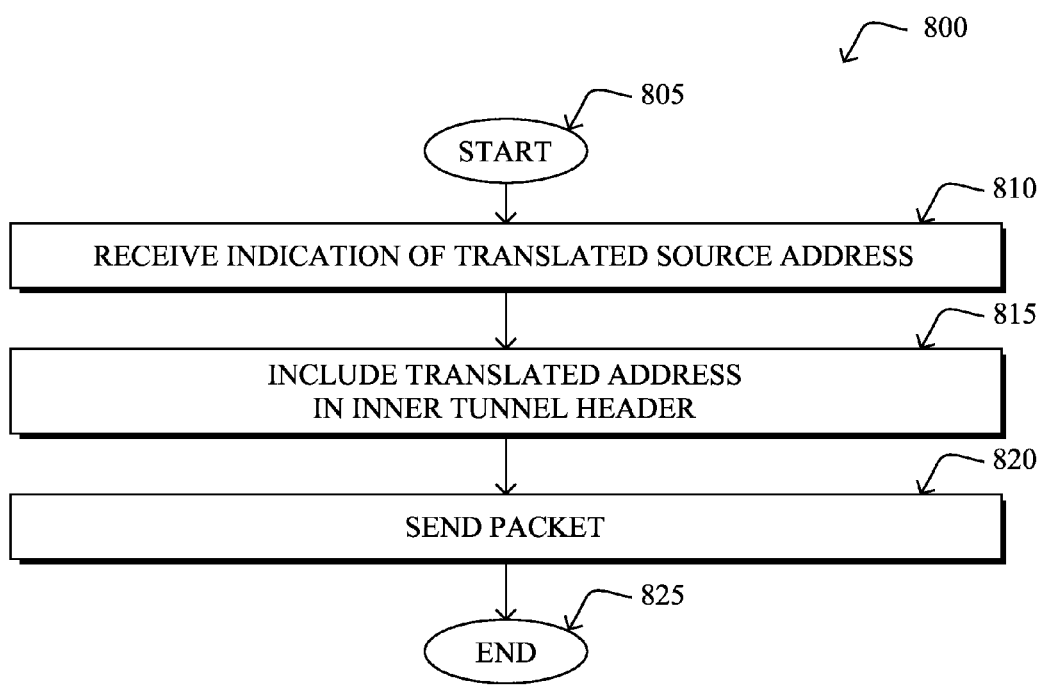
FIG. 8 illustrates an example simplified procedure for performing source address correction at a tunnel source.

FIG. 8 illustrates an example simplified procedure for performing source address correction at a tunnel source, according to various embodiments. In general, procedure 800 may be performed by a router or other networking device, such as the device that encapsulates tunnel-in-tunnel traffic. Procedure 800 may begin at step 805 and continue on to step 810 where, as described in greater detail above, the device may receive an indication of the translated source address from another networked device. For example, in one embodiment, the destination border router of the inner tunnel may provide an indication of the address translated by the PE-NAT back to the border router at the opposite end of the tunnel. Such an indication may be included, in one embodiment, within an NHRP message sent back to the encapsulating router.

At step 815, the device may include the translated address within the inner tunnel header during the encapsulation process, as detailed above. In particular, the device may use the translated source address within the inner header for the inner tunnel, prior to encapsulating the traffic for the outer tunnel. In one embodiment, the device may still use the original source address within the header for the outer tunnel, to allow the PE-NAT to instead make the translation during forwarding.

At step 820, as described in greater detail above, the device may send the packet including the translated source address toward the destination of the outer tunnel. In turn, when the packet is decapsulated at the destination of the outer tunnel, the source address in the header for the inner tunnel is already correct. Procedure 800 then ends at step 825.

Figure 9:
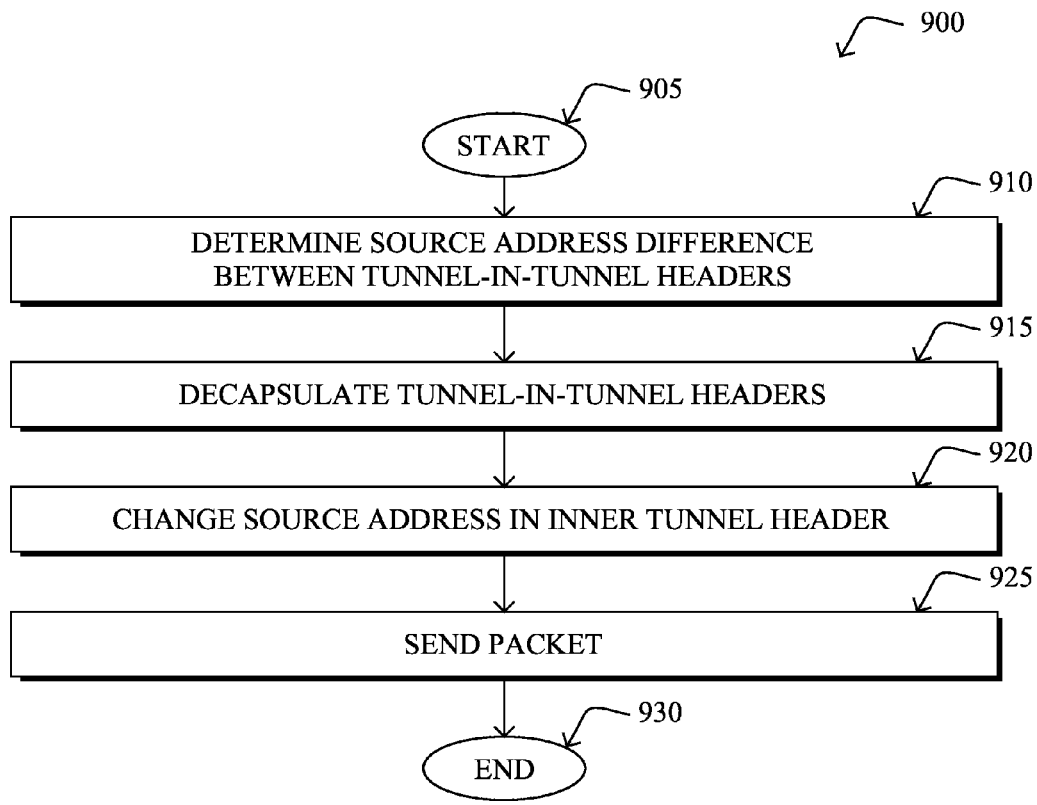
FIG. 9 illustrates an example simplified procedure for performing source address correction in conjunction with decapsulation of a tunnel-in-tunnel packet.

FIG. 9 illustrates an example simplified procedure for performing source address correction in conjunction with decapsulation of a tunnel-in-tunnel packet, according to various embodiments. In general, procedure 900 may be performed by any network device (e.g., a router, etc.) associated with the decapsulation of tunnel-in-tunnel traffic from the outer tunnel. Procedure 900 may begin at step 905 and continue on to step 910 where, as described in greater detail above, the device may determine a difference between the source addresses included in the inner and outer headers for the inner and outer tunnels of the tunnel-in-tunnel packet. For example, if the outer header includes a different source address than that of the inner header, the device may determine that the address in the outer header is a translated source address.

At step 915, as detailed above, the device may decapsulate the tunnel-in-tunnel traffic. Notably, the device may remove the outer header associated with the outer tunnel, thereby exposing the header associated with the inner tunnel. For example, as detailed above, if a VSP is used to process certain traffic, a device associated with the VSP may decapsulate the outer tunnel used to route the traffic to the VSP.

At step 920, the device may change the source address in the header that identifies the inner tunnel of the tunnel-in-tunnel traffic, as described in greater detail above. In particular, if the device determines that the source addresses in the inner and outer headers differ (e.g., in step 910), the device may change the source address in the inner header to be that of the translated address from the outer header.

At step 925, as detailed above, the device may send the packet with the translated address within the header that identifies the inner tunnel. For example, as shown in FIG. 6B, the device associated with VSP 324 may send packet 602 on to CE-B with the translated source address A' within header 604. Since the header now includes the translated source address, the receiving border router may be able to process the traffic normally. Procedure 900 then ends at step 930.

It should be noted that while certain steps within procedures 600-900 may be optional as described above, the steps shown in FIGS. 6-9 are merely examples for illustration and certain other steps may be included or excluded as desired. Further, while a particular order of the steps is shown, this ordering is merely illustrative, and any suitable arrangement of the steps may be utilized without departing from the scope of the embodiments herein. Moreover, while procedures 600-900 are described separately, certain steps from each procedure may be incorporated into each other procedure, and the procedures are not meant to be mutually exclusive.

The techniques described herein, therefore, provide for source address correction in tunnel-in-tunnel traffic, such as when the traffic is tunneled through a VSP. In one aspect, the address correction may be performed at the tunnel end that encapsulates the traffic. In another aspect, the address correction may instead be performed at the destination of the outer tunnel (e.g., at the VSP), prior to forwarding the traffic to the destination of the inner tunnel. Either technique is viable and straightforward, and depends solely on a preferred implementation. Without this technique, using a tunnel-in-tunnel double encapsulation through an SP-NAT would not be possible.

While there have been shown and described illustrative embodiments that provide for source address correction in tunnel-in-tunnel traffic, it is to be understood that various other adaptations and modifications may be made within the spirit and scope of the embodiments herein. For example, the techniques herein may be adapted for use with traffic encapsulated within any number of tunnels and/or using any number of different tunneling techniques. Additionally, the protocols discussed herein are exemplary only and other protocols may be used within the scope of the teachings herein.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method comprising:
receiving, by a device in the network, a tunnel-in-tunnel packet, wherein the tunnel-in-tunnel packet includes an inner header and an outer header to indicate different tunnels associated with the packet;
identifying, by the device, a translated source network address for a tunnel source of the tunnel-in-tunnel packet in the inner header;
including, by the device, the translated source network address within the outer header of the packet, wherein, as a result, the outer header of the packet identifies an inner tunnel that is encapsulated within an outer tunnel during transmission of the packet within the network; and
sending, by the device, the packet with the translated source network address within the outer header of the packet.

2. The method as in claim 1, wherein identifying the translated source address comprises:
receiving, at the device, an indication of the translated source address from a destination of the inner tunnel.

3. The method as in claim 2, wherein the indication of the translated source address is received via a Next Hop Resolution Protocol (NHRP) message.

4. The method as in claim 2, further comprising:
appending, by the device, the inner header with the translated source address to the packet, prior to appending the outer header to the packet that identifies the outer tunnel.

5. The method as in claim 1, wherein a destination of the outer tunnel is a virtual service platform (VSP).

6. The method as in claim 1, wherein the device is a destination of the outer tunnel, the method further comprising:
determining, by the device, a difference between the translated source address in the outer header of the packet and a source address included in the inner header that identifies the inner tunnel.

7. The method as in claim 6, further comprising:
decapsulating, by the device, the packet from the outer tunnel;
changing, by the device, the source address included in the inner header that identifies the inner tunnel to be the translated source address, based on the determined difference between the translated source address in the outer header and the source address included in the inner header that identifies the inner tunnel; and
sending, by the device, the decapsulated packet with the translated source address in the inner header that identifies the inner tunnel to a destination of the inner tunnel.

8. An apparatus, comprising:
one or more network interfaces to communicate with a computer network;
a processor coupled to the one or more network interfaces and configured to execute a process; and
a memory configured to store the process executable by the processor, the process when executed operable to:
receive a tunnel-in-tunnel packet, wherein the tunnel-in-tunnel packet includes an inner header and an outer header to indicate different tunnels associated with the packet;
identify a translated source network address for a tunnel source of the tunnel-in-tunnel packet in the inner header;
include the translated source network address within the outer header of the packet, wherein, as a result, the outer header of the packet identifies an inner tunnel that is encapsulated within an outer tunnel during transmission of the packet within the network; and
send the packet with the translated source network address within the outer header of the packet.

9. The apparatus as in claim 8, wherein the apparatus identifies the translated source address by receiving an indication of the translated source address from a destination of the inner tunnel.

10. The apparatus as in claim 9, wherein the indication of the translated source address is received via a Next Hop Resolution Protocol (NHRP) message.

11. The apparatus as in 9, wherein the process when executed operable to:
appending the inner header with the translated source address to the packet, prior to appending an outer header to the packet that identifies the outer tunnel.

12. The apparatus as in claim 8, wherein a destination of the outer tunnel is a virtual service platform (VSP).

13. The apparatus as in claim 8, wherein the process when executed operable to:
determine a difference between the translated source address in the outer header of the packet and a source address included in the inner header that identifies the inner tunnel.

14. The apparatus as in claim 13, wherein the process when executed is further operable to:
decapsulate the packet from the outer tunnel;
change the source address included in the inner header that identifies the inner tunnel to be the translated source address, based on the determined difference between the translated source address in the outer header and the source address included in the inner header that identifies the inner tunnel; and
send the decapsulated packet with the translated source address in the inner header that identifies the inner tunnel to a destination of the inner tunnel.

15. A tangible, non-transitory, computer-readable media having software encoded thereon, the software when executed by a processor on a device in a computer network operable to:
receive a tunnel-in-tunnel packet, wherein the tunnel-in-tunnel packet includes an inner header and an outer header to indicate different tunnels associated with the packet;
identify a translated source network address for a tunnel source of the tunnel-in-tunnel packet in the inner header;
include the translated source network address within the outer header of the packet, wherein, as a result, the outer header of the packet identifies an inner tunnel that is encapsulated within an outer tunnel during transmission of the packet within the network; and
send the packet with the translated source network address within the outer header of the packet.

16. The computer-readable media as in claim 15, wherein the device identifies the translated source address by receiving an indication of the translated source address from a destination of the inner tunnel.

17. The computer-readable media as in claim 15, wherein the software when executed by the processor of the device is further operable to:
- determine a difference between the translated source address in the outer header of the packet and a source address included in the inner header that identifies the inner tunnel;
- decapsulate the packet from the outer tunnel;
- change the source address included in the inner header that identifies the inner tunnel to be the translated source address, based on the determined difference between the translated source address in the outer header and the source address included in the inner header that identifies the inner tunnel; and
- send the decapsulated packet with the translated source address in the inner header that identifies the inner tunnel to a destination of the inner tunnel.

* * * * *

UNITED STATES PATENT AND TRADEMARK OFFICE
CERTIFICATE OF CORRECTION

PATENT NO. : 9,729,348 B2
APPLICATION NO. : 14/730654
DATED : August 8, 2017
INVENTOR(S) : Michael L. Sullenberger et al.

It is certified that error appears in the above-identified patent and that said Letters Patent is hereby corrected as shown below:

In the Claims

In Column 11, Line 43, please amend as shown:
header that identifies the inner tunnel.

Signed and Sealed this
Twenty-second Day of December, 2020

Andrei Iancu
*Director of the United States Patent and Trademark Office*